United States Patent
Overton et al.

(10) Patent No.: US 6,932,869 B2
(45) Date of Patent: Aug. 23, 2005

(54) UV-CURE OF COATING FOR OPTICAL FIBER ASSISTED BY ULTRASOUND

(75) Inventors: Bob J. Overton, Lenior, NC (US); Igor V. Khudyakov, Hickory, NC (US)

(73) Assignee: Alcatel, Paris (FR)

( * ) Notice: Subject to any disclaimer, the term of this patent is extended or adjusted under 35 U.S.C. 154(b) by 361 days.

(21) Appl. No.: 09/987,673

(22) Filed: Nov. 15, 2001

(65) Prior Publication Data

US 2003/0091734 A1 May 15, 2003

(51) Int. Cl.[7] .............................................. B05C 11/02
(52) U.S. Cl. ..................... 118/125; 118/67; 118/642
(58) Field of Search .................. 118/420, 125, 118/67, 68, DIG. 18, 72, 642, 56, 57, 405; 65/396, 529, 441, 443, 425, 432; 427/163.2, 560, 565, 601

(56) References Cited

U.S. PATENT DOCUMENTS

| | | |
|---|---|---|
| 5,037,763 A | 8/1991 | Petisce |
| 5,333,234 A | 7/1994 | Hashimoto et al. |
| 5,539,849 A | 7/1996 | Petisce |
| 5,858,053 A | 1/1999 | Kuck et al. |
| 5,939,137 A | 8/1999 | Kuck et al. |

FOREIGN PATENT DOCUMENTS

| | | | |
|---|---|---|---|
| EP | 0 530 715 A1 | | 3/1993 |
| EP | 0 662 355 A1 | | 7/1995 |
| JP | 57-92549 | * | 6/1982 |
| JP | 4-175245 | * | 6/1992 |
| WO | WO 89/02610 | | 3/1989 |

* cited by examiner

*Primary Examiner*—Brenda A. Lamb
(74) *Attorney, Agent, or Firm*—Sughrue Mion, PLLC

(57) ABSTRACT

The present invention provides an improved method and apparatus for curing coatings on optical fibers, without creating additional heat and compromising the manufacturing speed of optical fibers. The present invention uses at least one ultrasonic transducer coupled to a component of the optical fiber draw tower, such as the coating die, curing stage device or sheath, to emit ultrasound to the coating of the fiber. The use of ultrasound with current coating cure techniques, such as UV radiation curing, aids in accelerating the coating cure process through the effects of sonolysis, allowing an increase in current manufacturing speeds of optical fibers.

33 Claims, 1 Drawing Sheet

UV-CURE OF COATING FOR OPTICAL FIBER ASSISTED BY ULTRASOUND

BACKGROUND OF THE INVENTION

1. Field of the Invention

The present invention generally relates to the field of optical fibers, in particular the present invention is directed to using ultrasound to aid in the curing of UV-curable coatings of optical fibers.

2. Discussion of Related Art

Optical fibers are very small diameter glass strands which are capable of transmitting an optical signal over great distances, at high speeds, and with relatively low signal loss as compared to standard wire or cable networks. The use of optical fibers in today's technology has developed into many widespread areas, such as: medicine, aviation, communications, etc. Because of this development, there is a growing need to produce optical fibers of better quality at faster rates and lower costs.

Many of the areas of use for optical fibers, such as communications, require the optical fibers be protected from various destructive elements, such as adverse weather, moisture, impact damage, etc. This protection for the individual fibers comes from the fiber coatings. Today, most optical fibers have two coatings, which are often referred to as the primary and secondary coatings. The primary coating is applied onto the surface of the optical fiber, with the secondary coating being applied on top of the primary coating. The main function of the primary coating is to provide a soft "cushion" for the glass fiber, protecting it from shock damage. The main purpose of the secondary coating is to provide a semi-rigid protective shell to protect both the primary coating and the glass fiber from adverse environmental elements, as well as physical damage.

One of the most common methods of making optical fibers today is by a process often referred to as the "draw" process. In this process, a large glass preform is made. The preform is the actual material that the glass fiber (optical fiber) is made from. Once the preform is made, the next step is to "draw" the preform into a glass fiber (optical fiber) with the desired diameter. One of the most common means to accomplish this is through the use of a "draw tower". The "draw tower" is a production apparatus which has all of the major stages required to manufacture an optical fiber from a glass preform to the finished fiber. In this process the glass preform is typically suspended above the apparatus with the bottom most end of the preform entering into a furnace. The furnace uniformly melts the preform such that the preform exits the furnace as a very thin diameter optical glass fiber. The rate the preform is moved into the furnace can be regulated to allow the maintenance of a constant diameter in the optical fiber. Once the glass fiber leaves the furnace it is generally cooled.

After the glass fiber is cooled to a preset temperature then the fiber is typically coated with the primary coating. This is generally done in a coating die. The primary coating is applied in such a way as to completely cover the fiber. The primary coating is then cured or hardened. Once the primary coating has been cured or hardened, the secondary coating is then applied to completely cover the primary coating. The secondary coating is then cured so as to harden it and secure it to the primary coating. Once this process is complete then the fiber is generally considered an optical fiber, as commonly known and understood. Finally the optical fiber is wound past a capstan and onto a reel or spool.

The coatings of the optical fiber are mainly used to provide chemical, mechanical and environmental protection to the glass fiber core and cladding. To accomplish this purpose the two layers are usually made from different materials. Generally the primary coating is relatively soft (having a relatively low Modulus of Elasticity of 1–2 MPa) when compared to the secondary coating and is used as a cushion or shock protection for the glass fiber. The secondary coating is relatively hard (having a relatively high Modulus of Elasticity of 30–60 MPa) and provides a semi-rigid protective shell for the fiber and primary coating. The most common types of coatings used are ultraviolet (UV) curable coatings. These are coatings which have a photoinitiator component used in the coating composition which allow the curing of the coatings to be initiated by exposure to UV radiation.

Photoinitiators function by absorbing energy which is radiated by a UV, or sometimes a visible, light source. This energy absorption then initiates polymerization of the liquid coating placed on the fiber, and results in the hardening of the coating. The fast cure of coatings greatly reduces the production time of optical fibers, making production more profitable.

However, this method of curing optical fiber coatings is not without its problems. Among other things, the curing process can generate a large amount of heat in the coatings of the fiber. This heat generally comes from hot UV/Visible lamps by convection or by infrared irradiation accompanying the UV—or visible light of a lamp during cure, and from the exothermic polymerization (i.e. cure) itself. This heat also contributes in curing the coatings, but can cause serious problems. For instance, if the temperature of coating during cure is too high it may result in decomposition of microradicals in the coating material and result in a low degree of cure. Overall, it is generally known that excessive heat during the coating cure process is detrimental for efficient or effective cure by free radical polymerization.

As stated earlier, the primary coating should be relatively soft, to protect the glass fiber from microbending. Microbending is the formation of microscopic bends in the glass fiber, which will reduce the effectiveness of the fiber by reducing the magnitude of transmitted light power, i.e. attenuation. In the cure process the primary coating is applied and then cured, and then the secondary coating is applied and then cured. As the secondary coating is being cured, the primary coating is, and often additionally, cured up until 100% conversion of the coating monomer(s) into polymers.

Because of the problems associated with the generation of excessive heat during the cure process, many prior art methods have been developed to expedite the cure process without the generation of excessive heat. An example would be to reduce the level of UV radiation, however, with the reduction of UV radiation the line speed must be slowed to ensure that the coating receives the proper amount of UV exposure to effect a proper cure. This reduction in draw speed can severely affect the manufacturing efficiency of a fiber optic facility. It is desired to have a system of curing optical fiber coatings at as high a speed as possible.

SUMMARY OF THE INVENTION

The present invention is directed to a system and apparatus for curing optical fiber coatings at high line speeds. To accomplish this the present invention uses a combination of UV radiation and ultrasound to cure the optical fiber coatings.

In the present invention, an ultrasonic transducer is placed at a stage, along the fiber draw tower to emit ultrasound at the drawn fiber and coating to aid in the coating cure process. (It is noted, and further discussed below, that the present invention also contemplates the use of a plurality of transducers at various locations along the draw tower.) By using ultrasound to aid the coating cure process the polymerization of the coating material can be accelerated.

In the present invention, an ultrasonic transducer can be attached to many of the components in a fiber draw tower but preferably should be coupled to either the fiber coating die, which applies the coating to the drawn fiber, or to the quartz tube through which the fiber is drawn when it undergoes its UV radiation curing, or both. Further, the ultrasonic emissions by the transducers can be either done in pulses or through constant excitation depending on the manufacturing and production needs.

BRIEF DESCRIPTION OF THE DRAWINGS

The advantages, nature and various additional features of the invention will appear more fully upon consideration of the illustrative embodiment of the invention which is schematically set forth in the drawing, in which.

DETAILED DESCRIPTION OF THE INVENTION

Figure 1:
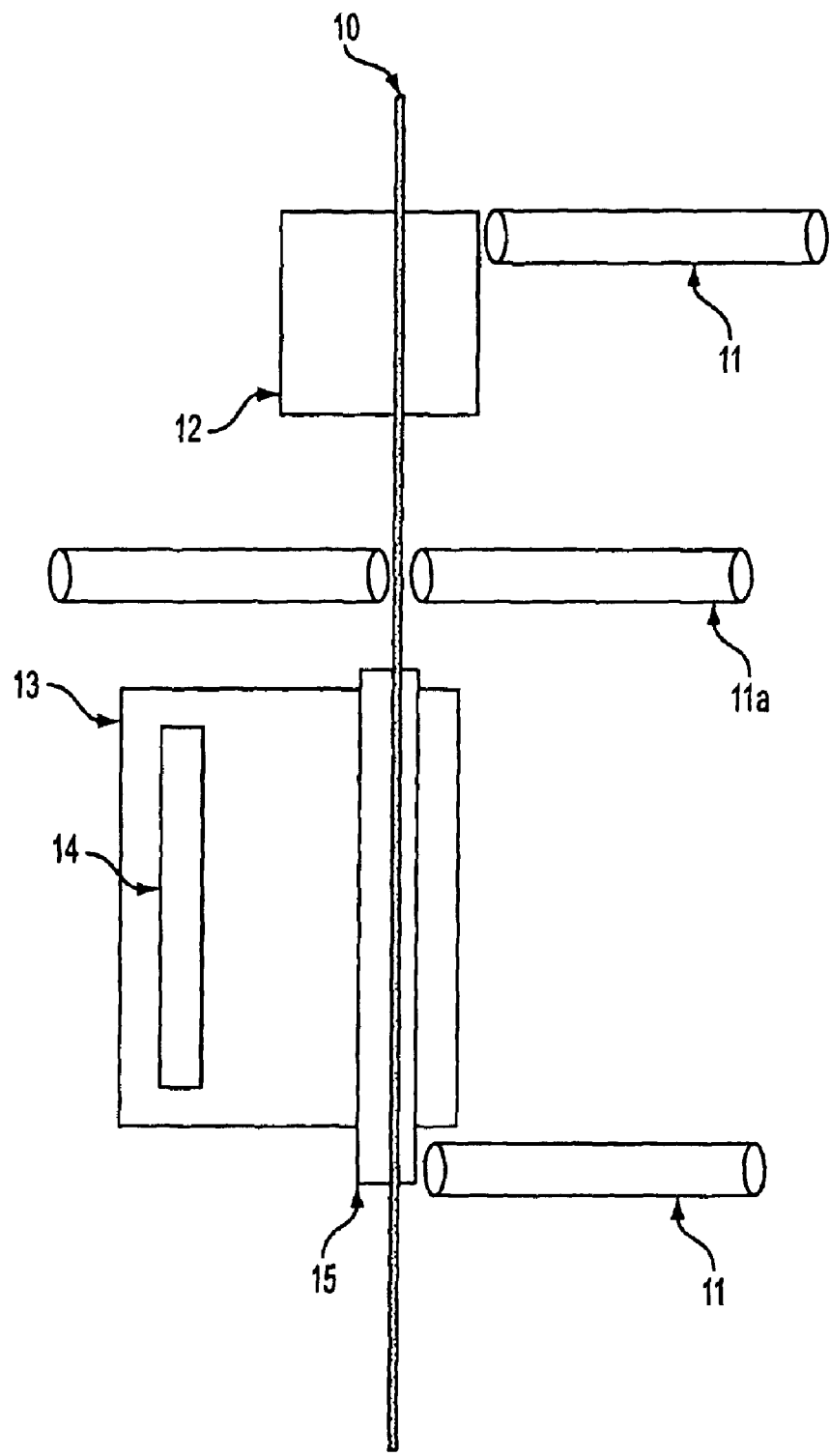
FIG. 1 is a diagrammatical representation of a optical fiber coating and cure apparatus according to the present invention.

The present invention will be explained in further detail by making reference to the accompanying drawings, which do not limit the scope of the invention in any way.

Turning now to FIG. 1, optical fiber coating and cure stages according to the present invention are shown. As shown in FIG. 1, a fiber 10 is drawn along a draw line and passes through a coating die 12, which deposits the coating material onto the fiber 10. The coating die 12 can be for either the primary or secondary coating of an optical fiber, and can deposit onto the fiber 10 any coating material whose curing is benefited by the use of ultrasonic excitation. In the present invention, any commonly known or used coating material can be used. However, it is preferred that the coating be a di-functional urethane acrolate.

In an embodiment of the present invention, an ultrasonic transducer (or transducers) 11 is coupled to the coating or the coating die 12 such that the ultrasonic waves excite the liquid coating as it is being applied to the fiber 10. This excitation aids in the polymerization of the coating on the fiber, thus aiding in the curing process. In the preferred embodiment, the ultrasonic frequency used is between $2^4$ to $10^9$ Hz, however, it is noted that the present invention is not limited to use in this range, and more particularly the optimum frequency to be used should be determined and optimized based on the coating material used. It is further noted that the ultrasound can also be applied in pulses or bursts.

The application of the ultrasound to the coating or the coating die 12 causes cavitation in the liquid coating material and in a non-completely cured coating results in the formation of additional free radicals (i.e. sonolysis), which increases the rate and efficiency of the cure. Further, it also increases the mobility and motion of oligomer ends in the coating material, thus increasing the number of polymerization additions per unit time, i.e. increasing the rate of propagation of polymerization at all stages of the cure process. It should be noted that determination of the optimal frequency should be done for each type of coating used. The proper frequency should accelerate relaxation of the formed polymeric coating to its most thermodynamically stable conformation and to increase the Modulus of the coating. However, if the ultrasound is too powerful it may damage the coating or the fiber. After the fiber 10 passes through the coating die 12, which may or may not have a transducer(s) 11 coupled to it (or the coating within the die), the fiber 10 passes through a UV curing stage. Common UV curing stages comprise a reflector 13 to reflect UV rays from the UV bulb 14 onto the fiber 10. They further comprise a quartz tube 15, through which the fiber 10 passes to protect the fiber 10 from the high velocity cooling gases used to keep the bulb 14 cool. In an alternative embodiment of the present invention, an additional transducer 11 is coupled to the quartz tube 15 in the UV curing stage. The transducer 11 should be mounted such that the center of the tube 15 vibrates with the ultrasonic frequency emitted from the transducer 11, thus causing the fiber 10 coating to vibrate at the desired frequency (which in the preferred embodiment is in the range of $2^4$ to $10^9$ Hz). This is because the lower frequencies of ultrasound can be transmitted through the air over the short distances inside the tube 15. The vibrational energy from the ultrasound aids the polymerization of the UV cure process and accelerates the speed at which a proper cure can occur.

Most common ultrasonic transducers comprise an ultrasonic horn. In the preferred embodiment of the present invention, the tip (or tips) of the ultrasonic horn (or horns if more than one are used) are positioned such that they make contact with the coatings. For example, a transducer 11 positioned in the coating die 12 should have its tip inserted into the coating material, or if the a transducer 11 is positioned after the coating die 12 but prior to the UV curing stage its tip should positioned such that it makes contact with the coating to be cured. In yet another alternative embodiment, a transducer 11 is used after the UV curing stage to aid in completing the cure of the coating. In this embodiment it is possible to use a lesser than normal amount of UV cure (to keep the heat generated to a minimum) while completing the cure of the coating with the application of ultrasound according to the present invention. Again, in this embodiment it is preferred that the tip of the transducer horn make contact with the coating to be cured.

In the preferred embodiment of the present invention, a plurality of transducers 11a are placed circumferentially around the fiber 10 after the fiber coating die 12, but prior to the fiber entering the UV cure stage 13, 14, 15. In this embodiment, a plurality of transducers are placed circumferentially around the fiber 10 to effect an even peripheral cure around the fiber 10. Although one transducer may be used, it is preferred to have at least two transducers 11a positioned 180 degrees to each other (at opposite sides of the fiber 10) or have three transducers positioned 120 degrees to each other. In this embodiment, the tips of the transducers 11a should make contact with the coating to ensure optimum cure performance. It should be noted that as an alternative to the above preferred embodiment, it is also contemplated that instead of using a combination of transducers 11a (as described above) a single transducer 11a can be used with an annular collar (not shown). In this embodiment, the fiber passes through an annular collar which acts as a cylindrical resonator to effect resonation in the fiber 10 coating. It is preferred that the interior surfaces of the collar be coated with a lubricant which is compatible with the coating material to ensure that the coating does not stick to the inside of the collar. An example of such a coating would be Teflon®. In this configuration, a single (or multiple) transducer 11a is coupled to the collar, thus preventing the need for the transducer 11a to be contacting the coating.

In yet other embodiments of the present invention, a transducer 11 can be added to a sheave at the base of the draw tower, or at any other location along the height of the draw tower. It should be noted that the present invention is not limited to any one configuration and location of the transducers 11, and they can be located at any one, two or all of the above referenced locations in a fiber draw tower, in addition to others. Exact placement, attachment, and location of the transducers 11 should be optimized for each manufacturing facility and technique. Further, the frequencies used should also be optimized depending on the coating materials used and the frequencies needed to optimize the cure process. Although it is preferred that in a configuration where multiple transducers 11 are used the transducers emit the same frequency, it is contemplated that with certain coatings and to meet certain manufacture specifications frequencies at different transducers 11 along a draw tower may emit different frequencies to optimize the cure of the fiber coatings.

It is important to note that the above invention is not limited to the manufacture of optical fibers, but can be applied in any situation where a material is heat or thermally cured. Further, the present invention can be used during the manufacture of fiber optic ribbons or other situations where groups of components are secured to each other with a matrix material that is cured thermally, and positively reacts to ultrasonic excitation.

It is of course understood that departures can be made from the preferred embodiments of the invention by those of ordinary skill in the art without departing from the spirit and scope of the invention that is limited only by the following claims.

We claim:

1. An apparatus for curing a coating on an optical fiber, comprising:
    an optical fiber draw tower along which an optical fiber is drawn, comprising:
        a coating die, through which said optical fiber passes to receive a coating;
        and a curing device located downstream from said coating die to cure said coating; and
    at least one ultrasonic transducer emitting ultrasound and coupled to said draw tower,
    wherein curing of said coating is at least partially effected by said ultrasound, and
    wherein said curing device comprises a UV radiation emitting device.

2. The apparatus claimed in claim 1, wherein said at least one ultrasonic transducer is coupled to at least one of said coating die and said curing device.

3. The apparatus claimed in claim 1, having at least two ultrasonic transducers, wherein both of said coating die and said curing device are coupled to at least one of said at least two ultrasonic transducers.

4. The apparatus claimed in claim 1, wherein said curing device comprises said UV radiation emitting device and an additional ultrasonic transducer, and wherein the ultrasonic transducers emits ultrasound in pulses.

5. The apparatus claimed in claim 1, wherein said at least one ultrasonic transducer emits ultrasound in pulses.

6. The apparatus claimed in claim 1, wherein said at least one ultrasonic transducer emits a frequency in the range of $2^4$ to $10^9$ Hz.

7. The apparatus claimed in claim 1, wherein said at least one ultrasonic transducer is coupled to said draw tower upstream of at least one of said coating die and said curing device.

8. The apparatus claimed in claim 1, wherein said at least one ultrasonic transducer is coupled to said draw tower downstream of at least one of said coating die and said curing device.

9. The apparatus claimed in claim 1, wherein said at least one ultrasonic transducer makes contact with said coating.

10. The apparatus claimed in claim 1, having at least two ultrasonic transducers both of which make contact with said coating.

11. The apparatus claimed in claim 1, wherein said at least one transducer is located downstream of said curing device and makes contact with said coating.

12. An apparatus for curing a coating on an optical fiber, comprising:
    and optical fiber draw tower along which an optical fiber is drawn, comprising:
        a coating die, through which said optical fiber passes to receive a coating;
        and a curing device located downstream from said coating die to cure said coating; and
    at least two ultrasonic transducers emitting ultrasound and coupled to said draw tower,
    wherein curing of said coating is at least partially effected by said ultrasound, and
    wherein both of said coating die and said curing device are coupled to at least one of said at least two ultrasonic transducers.

13. The apparatus claimed in claim 12, wherein said curing device comprises a UV radiation emitting device and wherein one of said at least two ultrasonic transducers emits ultrasound in pulses.

14. The apparatus claimed in claim 12, wherein said at least one ultrasonic transducer emits ultrasound in pulses.

15. The apparatus claimed in claim 12, wherein at least one of said ultrasonic transducers emits a frequency in the range of $2^4$ to $10^9$ Hz.

16. An apparatus for curing a coating on an optical fiber, comprising:
    an optical fiber draw tower along which an optical fiber is drawn, comprising:
        a coating die, through which said optical fiber passes to receive a coating; and
        a curing device located downstream from said coating die to cure said coating,
    wherein said curing device comprises a UV radiation emitting device and at least one ultrasonic transducer which emits ultrasound, and
    wherein curing of said coating is at least partially effected by said ultrasound.

17. The apparatus claimed in claim 16, wherein said at least one ultrasonic transducer emits ultrasound in pulses.

18. The apparatus claimed in claim 16, wherein said at least one ultrasonic transducer emits a frequency in the range of $2^4$ to $10^9$ Hz.

19. An apparatus for curing a coating on an optical fiber, comprising:
    an optical fiber draw tower along which an optical fiber is drawn, comprising:
        a coating die, through which said optical fiber passes to receive a coating;
        and a curing device located downstream from said coating die to cure said coating; and at least one ultrasonic transducer emitting ultrasound and coupled to said draw tower, wherein curing of said coating is at least partially effected by said ultrasound, and wherein said at least one ultrasonic transducer emits ultrasound in pulses.

20. The apparatus claimed in claim 19, wherein said at least one ultrasonic transducer emits a frequency in the range of $2^4$ to $10^9$ Hz.

21. The apparatus claimed in claim 19, wherein said at least one ultrasonic transducer emits a frequency in the range of $2^4$ to $10^9$ Hz and wherein said curing device comprises a UV radiation emitting device.

22. An apparatus for curing a coating on an optical fiber, comprising:

an optical fiber draw tower along which an optical fiber is drawn, comprising:
a coating die, through which said optical fiber passes to receive a coating;
and a curing device located downstream from said coating die to cure said coating; and at least one ultrasonic transducer emitting ultrasound and coupled to said draw tower, wherein curing of said coating is at least partially effected by said ultrasound, and wherein said at least one ultrasonic transducer is coupled to said draw tower downstream of at least one of said coating die and said curing device.

23. The apparatus claimed in claim 22, wherein said at least one ultrasonic transducer emits ultrasound in pulses.

24. The apparatus claimed in claim 22, wherein said at least one ultrasonic transducer emits a frequency in the range of $2^4$ to $10^9$ Hz.

25. An apparatus for curing a coating on an optical fiber, comprising:

an optical fiber draw tower along which an optical fiber is drawn, comprising:
a coating die, through which said optical fiber passes to receive a coating;
and a curing device located downstream from said coating die to cure said coating; and at least one ultrasonic transducer emitting ultrasound and coupled to said draw tower, wherein curing of said coating is at least partially effected by said ultrasound, and wherein said at least one ultrasonic transducer makes contact with said coating.

26. The apparatus claimed in claim 25, wherein said at least one ultrasonic transducer emits ultrasound in pulses.

27. The apparatus claimed in claim 25, wherein said at least one ultrasonic transducer emits a frequency in the range of $2^4$ to $10^9$ Hz.

28. An apparatus for curing a coating on an optical fiber, comprising:

and optical fiber draw tower along which an optical fiber is drawn, comprising:
a coating die, through which said optical fiber passes to receive a coating;
and a curing device located downstream from said coating die to cure said coating; and at least two ultrasonic transducers emitting ultrasound and coupled to said draw tower, wherein curing of said coating is at least partially effected by said ultrasound, and wherein both of said at least two transducers make contact with said coating.

29. The apparatus claimed in claim 28, wherein at least one of said at least two ultrasonic transducers emits ultrasound in pulses.

30. The apparatus claimed in claim 28, wherein at least one of said ultrasonic transducers emits a frequency in the range of $2^4$ to $10^9$ Hz.

31. An apparatus for curing a coating on an optical fiber, comprising:

an optical fiber draw tower along which an optical fiber is drawn, comprising:
a coating die, through which said optical fiber passes to receive a coating;
and a curing device located downstream from said coating die to cure said coating; and at least one ultrasonic transducer emitting ultrasound and coupled to said draw tower, wherein curing of said coating is at least partially effected by said ultrasound, and wherein said at least one transducer is located downstream of said curing device and makes contact with said coating.

32. The apparatus claimed in claim 31, wherein said at least one ultrasonic transducer emits ultrasound in pulses.

33. The apparatus claimed in claim 1, wherein said at least one ultrasonic transducer emits a frequency in the range of $2^4$ to $10^9$ Hz.

* * * * *